(12) United States Patent
Jahns et al.

(10) Patent No.: US 7,572,397 B2
(45) Date of Patent: Aug. 11, 2009

(54) MICROCAPSULES

(75) Inventors: Ekkehard Jahns, Weinheim (DE); Hans-Juergen Denu, Friedelsheim (DE); Joachim Pakusch, Speyer (DE); Horst Seibert, Fussgoenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 323 days.

(21) Appl. No.: 10/302,996

(22) Filed: Nov. 25, 2002

(65) Prior Publication Data
US 2003/0118822 A1    Jun. 26, 2003

(30) Foreign Application Priority Data
Dec. 20, 2001    (DE) ................ 101 63 162

(51) Int. Cl.
*B31J 13/18* (2006.01)
*A61K 9/14* (2006.01)
(52) U.S. Cl. .............. 264/4.6; 264/4.7; 427/213.31; 427/213.34
(58) Field of Classification Search .......... 428/402.2, 428/402.21, 402.24; 427/213.3, 213.31, 427/213.33, 213.34, 213.35, 220, 221, 213.32; 264/4.1, 4.32, 4.33, 4.7, 4.6
See application file for complete search history.

(56) References Cited

U.S. PATENT DOCUMENTS

| | | | |
|---|---|---|---|
| 3,615,972 A | 10/1971 | Morehouse, Jr. et al. | |
| 4,016,110 A | 4/1977 | Cohrs et al. | |
| 4,026,970 A * | 5/1977 | Backderf et al. | 525/218 |
| 4,421,660 A | 12/1983 | Solc Nee Hajna | |
| 5,470,512 A * | 11/1995 | Noji et al. | 264/4.1 |
| 5,804,298 A | 9/1998 | Moy | |
| 6,197,863 B1 * | 3/2001 | Eck et al. | 524/430 |
| 6,200,681 B1 * | 3/2001 | Jahns et al. | 428/402.24 |

FOREIGN PATENT DOCUMENTS

| | | |
|---|---|---|
| DE | 199 59 806 | 6/2001 |
| DE | 100 00 223 | 7/2001 |
| DE | 101 39 171 | 2/2003 |
| EP | 0 457 154 | 11/1991 |
| EP | 463 926 | 1/1992 |
| EP | 0 539 142 | 4/1993 |
| WO | WO 99/24525 | 5/1999 |

* cited by examiner

*Primary Examiner*—Thao T. Tran
(74) *Attorney, Agent, or Firm*—Oblon, Spivak, McClelland, Maier & Neustadt, P.C.

(57) ABSTRACT

Microcapsules comprising one or more lipophilic substances as core material and a polymer as capsule shell, which are obtainable by free-radical polymerization of an oil-in-water emulsion comprising
from 30 to 100% by weight, based on the total weight of the monomers, of one or more $C_1$-$C_{24}$-alkyl esters of acrylic and/or methacrylic acid (monomer I),
from 0 to 80% by weight, based on the total weight of the monomers, of a bifunctional or polyfunctional monomer (monomers II) which is insoluble or sparingly soluble in water and
from 0 to 40% by weight, based on the total weight of the monomers, of other monomers (monomers III),
the lipophilic substance and solid inorganic particles having a mean particle size of from 45 to 1000 nm, and a process for producing them are described. They can be used in binding building materials, textiles and gypsum plasterboard.

7 Claims, No Drawings

MICROCAPSULES

The present invention relates to microcapsules comprising one or more lipophilic substances as core material and a polymer as capsule shell, which are obtainable by free-radical polymerization of an oil-in-water emulsion comprising from 30 to 100% by weight, based on the total weight of the monomers, of one or more $C_1$-$C_{24}$-alkyl esters of acrylic and/or methacrylic acid (monomer I), from 0 to 80% by weight, based on the total weight of the monomers, of a bifunctional or polyfunctional monomer (monomers II) which is insoluble or sparingly soluble in water and from 0 to 40% by weight, based on the total weight of the monomers, of other monomers (monomers III), the lipophilic substance and solid inorganic particles having a mean particle size of from 45 to 1000 nm, a process for producing them and their use in binding building materials, textiles and gypsum plasterboard.

Microcapsules having a capsule shell which are produced by free-radical polymerization are known in a variety of applications. Thus, they are used, depending on the permeability of the capsule wall, in drugs or crop protection compositions for the encapsulation of active compounds, in carbonless copying papers or as heat storage media. While a certain permeability is desired in the case of active compounds so as to make controlled release of the active compound possible, impermeable capsule walls are required for use in copying paper and as heat storage media. Since the wall thickness generally increases/decreases together with the capsule size, the smallest capsules of a distribution are often undesirable. The production process is also required to give a narrow capsule size distribution.

EP-A-463 926 teaches the use of finely divided mineral powders for the production of microcapsules comprising amino resins.

EP-A-539 142 describes the production of microcapsules comprising both amino resins and polyureas using colloidal inorganic particles having a mean particle size of <30 nm for stabilizing the oil-in-water emulsion. According to this document, a particle size of 100 nm leads to an undesirably broad capsule size distribution, as can be seen from Table 1.

U.S. Pat. No. 3,615,972 describes a process for producing foamable microcapsules comprising methyl methacrylate as capsule wall and neopentane as capsule core using solid inorganic particles. The emulsion is stabilized using "Ludox® HS", which is a colloidal silica dispersion whose mean particle size is 12 nm.

WO 99/24525 teaches the production of microencapsulated latent heat storage oils and/or waxes having capsule walls based on polymethyl methacrylate using a colloidal silica dispersion having a mean particle size of the silicon dioxide particles of 12 nm. The resulting microencapsulated latent heat storage materials are advantageous for use in mineral-based moldings and coating compositions.

The earlier German application 10 139 171.4 teaches the use of such microencapsulated latent heat storage materials in gypsum plasterboard.

It has been found that when microcapsules based on alkyl esters of acrylic and/or methacrylic acid are produced using silica dispersions having a mean particle size of the silicon dioxide of 12 nm, the proportion of microcapsules having a diameter of $\leq 4$ µm is about 10%.

It is an object of the present invention to provide microcapsule dispersions having a reduced proportion of microcapsules whose diameter is $\leq 4$ µm. Furthermore, the microcapsule dispersions obtained should have a narrow capsule size distribution. The capsules should have a high impermeability and good heat storage properties, in particular for use in gypsum plasterboard and mineral-based moldings and coating compositions.

We have found that this object is achieved by the abovementioned microcapsules, a process for producing them and their use in gypsum plasterboard, mineral-based moldings and mineral-based coating compositions.

The microcapsules of the present invention can be produced by in-situ polymerization. The capsule core is formed by the lipophilic substance which is emulsifiable in water. The lipophilic substance simultaneously serves as solvent or dispersant for the monomers from which the capsule wall is formed. A stable oil-in-water emulsion is firstly prepared from monomers, lipophilic substance and the solid inorganic particles.

In this emulsion, the lipophilic substance and monomers essentially form the disperse phase. The polymerization then takes place in the oil phase of the stable oil-in-water emulsion. It is triggered by heating the emulsion. While the monomers are substantially soluble in the oil phase, the oligomers and polymers formed become insoluble and migrate to the interface between oil and water phases. There, during the course of the further polymerization they form the wall material which finally encloses the lipophilic substance.

The solid inorganic particles act like protective colloids. They allow stabilization by fine solid particles. The particles remain solid under the reaction conditions. They are insoluble but dispersible in water or are neither soluble nor dispersible in water, but can be wetted by the lipophilic substance. These solid inorganic particles are preferably located at the interface between oil and water phases. The microcapsules of the invention have a coating of solid inorganic particles which may be partly built into the wall. Owing to their mode of action, the solid inorganic particles are also referred to as Pickering systems (cf. U.S. Pat. Nos. 3,615,972 and 4,016,110).

A Pickering system can consist of the solid inorganic particles alone or consist of these together with auxiliaries which improve the dispersibility of the particles in water or the wettability of the particles by the lipophilic phase. These auxiliaries are, for example, nonionic, anionic, cationic or zwitterionic surfactants or polymeric protective colloids, as are described below. In addition, buffer substances can be added to set particular, advantageous pH values of the water phase. This can reduce the water-solubility of the fine particles and increase the stability of the emulsion. Customary buffer substances are phosphate buffers, acetate buffers and citrate buffers.

The solid inorganic particles can be metal salts such as salts, oxides and hydroxides of calcium, magnesium, iron, zinc, nickel, titanium, aluminum, silicon, barium and manganese. Particular mention may be made of magnesium hydroxide, magnesium carbonate, magnesium oxide, calcium oxalate, calcium carbonate, barium carbonate, barium sulfate, titanium dioxide, aluminum oxide, aluminum hydroxide and zinc sulfide. Silicates, bentonite, hydroxyapatite and hydrotalcites may likewise be mentioned. Particular preference is given to using finely divided silicas, magnesium pyrophosphate and tricalcium phosphate.

Preference is given to solid inorganic particles having a mean size of from 45 to 500 nm, in particular from 45 to 200 nm. The lower mean particle size limit is preferably 50 nm, in particular 60 nm. The sizes quoted are based on the number average of the colloid dispersion used, determined by means of light scattering.

The Pickering systems can either be added to the water phase initially or be added to the mixture of oil and water phase. Some solid inorganic particles are prepared by precipitation. Thus, magnesium pyrophosphate is prepared by combining aqueous solutions of sodium pyrophosphate and magnesium sulfate.

In general, the pyrophosphate is prepared immediately before dispersion by combining an aqueous solution of an alkali metal pyrophosphate with at least the stoichiometrically required amount of a magnesium salt which may be present in solid form or in aqueous solution. In a preferred embodiment, the magnesium pyrophosphate is prepared by combining aqueous solutions of sodium pyrophosphate ($Na_4P_2O_7$) and magnesium sulfate ($MgSO_4.7H_2O$).

The finely divided silicas can be dispersed in water as fine, solid particles. However, it is also possible to use colloidal dispersions of silica in water. The colloidal dispersions are alkaline, aqueous mixtures of silica. The colloidal silica dispersions are usually stabilized by alkali, e.g. by addition of sodium hydroxide or ammonia. However, there are also low-salt or desalinated dispersions which are stable in the acid pH range, for instance from pH 2 to 5 ("storage-stable"). If alkali-stabilized dispersions are used as Pickering system, it is advantageous for the pH of the mixture for preparing the oil-in-water emulsion to be adjusted to from pH 2 to 7, preferably from pH 2 to 6, in particular from pH 2 to 5, by means of an acid. Preferred acids for the adjustment are mineral acids such as nitric acid, hydrochloric acid, phosphoric acid and sulfuric acid and also organic acids such as citric acid, formic acid and amidosulfonic acid. The oil-in-water emulsion is referably prepared at a pH in the range from 2 to 6 which has been set by means of citric acid, formic acid, hydrochloric acid, nitric acid, phosphoric acid, sulfuric acid and/or amidosulfonic acid. Particularly for use of the microcapsules in gypsum products, mineral acids, in particular monobasic mineral acids such as nitric acid, have been found to be advantageous.

The solid inorganic particles are generally used in amounts of from 0.5 to 15% by weight, based on the water phase.

Particular preference is given to using solid inorganic particles having a mean size of from 45 to 1000 nm, if desired in admixture with organic protective colloids. The total amount of protective colloid and solid inorganic particles having a mean size of from 45 to 1000 nm is from 0.5 to 15% by weight, based on the water phase.

Among organic protective colloids, a distinction is made between uncharged and anionic protective colloids, which can be used individually or together.

Uncharged protective colloids are cellulose derivatives such as hydroxyethylcellulose, carboxymethylcellulose and methylcellulose, polyvinylpyrrolidone, copolymers of vinylpyrrolidone, gelatin, gum arabic, xanthan gum, sodium alginate, casein, polyethylene glycols, preferably polyvinyl alcohol and partially hydrolyzed polyvinyl acetates.

Suitable anionic protective colloids are polymethacrylic acid, the copolymers of sulfoethyl acrylate and methacrylate, sulfopropyl acrylate and methacrylate, of N-(sulfoethyl)maleimide, of 2-acrylamido-2-alkylsulfonic acids, of styrenesulfonic acid and of vinylsulfonic acid, naphthalenesulfonic acid and naphthalenesulfonic acid-formaldehyde condensates, polyacrylic acids and phenolsulfonic acid-formaldehyde condensates.

The uncharged protective colloids are generally used in amounts of from 0.001 to 5% by weight, based on the water phase of the emulsion, preferably from 0.01 to 2% by weight.

The anionic protective colloids are generally used in amounts of from 0.01 to 5% by weight, based on the water phase of the emulsion.

As organic protective colloids, preference is given to using uncharged protective colloids in combination with the solid inorganic particles. A particularly preferred uncharged protective colloid is methylcellulose.

Preference is given to using from 1 to 10% by weight, in particular from 2 to 8% by weight, of solid inorganic particles and from 0.01 to 2% by weight, in particular from 0.01 to 1% by weight, of uncharged protective colloids, in each case based on the water phase of the emulsion.

The microcapsules obtained in this way display advantageous properties when incorporated into gypsum building products.

The disperse phase comprises the monomers, the lipophilic substance and the free-radical initiator. The proportion of disperse phase in the oil-in-water emulsion is preferably from 20 to 60% by weight. The capsule wall is produced by free-radical polymerization of the abovementioned monomer mixture. The monomer mixture is preferably composed of from 30 to 95% by weight of monomers I, from 5 to 60% by weight, in particular from 10 to 50% by weight, of monomers II and from 0 to 40% by weight, preferably from 0 to 30% by weight, of monomers III, with the total amount of all monomers being 100% by weight.

Suitable monomers I are $C_1$-$C_{24}$-alkyl esters of acrylic and/or methacrylic acid. Particularly preferred monomers I are methyl, ethyl, n-propyl and n-butyl acrylate and/or the corresponding methacrylates. Preference is given to isopropyl, isobutyl, sec-butyl and tert-butyl acrylate and the corresponding methacrylates. Mention may also be made of methacrylonitrile. In general, the methacrylates are preferred.

Suitable monomers II are bifunctional or polyfunctional monomers which are insoluble or sparingly soluble in water but have a good to limited solubility in the lipophilic substance. For the purposes of the present invention, sparing solubility means a solubility of less than 60 g/l at 20° C.

For the purposes of the present invention, bifunctional or polyfunctional monomers are compounds which have at least two nonconjugated ethylenic double bonds.

Particularly useful monomers of this type are divinyl and polyvinyl monomers which effect crosslinking of the capsule wall during the polymerization.

Preferred bifunctional monomers are diesters of diols with acrylic acid or methacrylic acid, also the diallyl and divinyl ethers of these diols.

Preferred divinyl monomers are ethanediol diacrylate, divinylbenzene, ethylene glycol dimethacrylate, 1,3-butylene glycol dimethacrylate, methallylmethacrylamide and allyl methacrylate. Particular preference is given to propanediol diacrylate, butanediol diacrylate, pentanediol diacrylate and hexanediol diacrylate and the corresponding methacrylates.

Preferred polyvinyl monomers are trimethylolpropane triacrylate and trimethacrylate, pentaerythritol triallyl ether and pentaerythritol tetraacrylate.

Possible monomers III are other monomers; preference is given to monomers IIIa such as styrene, α-methylstyrene, β-methylstyrene, butadiene, isoprene, vinyl acetate, vinylpropionate and vinylpyridine.

Particular preference is given to the water-soluble monomers IIIb, e.g. acrylonitrile, methacrylamide, acrylic acid, methacrylic acid, itaconic acid, maleic acid, maleic anhydride, N-vinylpyrrolidone, 2-hydroxyethyl acrylate and methacrylate and acrylamido-2-methylpropanesulfonic acid. Mention may also be made of, in particular, N-methylolacrylamide, N-methylolmethacrylamide, dimethylaminoethyl methacrylate and diethylaminoethyl methacrylate.

Possible lipophilic substances are materials which have only limited solubility in water. The solubility in water should preferably not exceed 5% by weight. Examples which may be mentioned are alkylnaphthalenes, partially hydrogenated terphenyls, aromatic hydrocarbons such as xylene, toluene, dodecylbenzene, aliphatic hydrocarbons such as petroleum spirit and mineral oil, chloroparaffins, fluorinated hydrocarbons, natural oils such as peanut oil, soybean oil, also adhesives, flavors and perfume oils. These liquids can further comprise active compounds such as crop protection agents or pharmaceuticals, dyes or color formers in dissolved or suspended form.

Particular preference is given to microcapsules containing lipophilic substances whose solid/liquid phase transition is in the temperature range from –20 to 120° C., which are known as latent heat storage materials.

Examples of suitable lipophilic substances are:
  aliphatic hydrocarbon compounds such as saturated or unsaturated $C_{10}$-$C_{40}$-hydrocarbons which are branched or preferably linear, e.g. n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, and also cyclic hydrocarbons, e.g. cyclohexane, cyclooctane, cyclodecane;
  aromatic hydrocarbon compounds such as benzene, napthalene, biphenyl, o- or n-terphenyl, $C_1$-$C_{40}$-alkyl-substituted aromatic hydrocarbons such as dodecylbenzene, tetradecylbenzene, hexadecylbenzene, hexylnaphthalene or decylnaphthalene;
  saturated or unsaturated $C_6$-$C_{30}$-fatty acids such as lauric acid, stearic acid, oleic acid or behenic acid, preferably eutectic mixtures of decanoic acid with, for example, myristic, palmitic or lauric acid;
  fatty alcohols such as lauryl, stearyl, oleyl, myristyl, cetyl alcohol, mixtures such as coconut fatty alcohol and also oxo alcohols which are obtained by hydroformylation of α-olefines and further reactions;
  $C_6$-$C_{30}$-fatty amines such as decylamine, dodecylamine, tetradecylamine or hexadecylamine;
  esters such as $C_1$-$C_{10}$-alkyl esters of fatty acids, e.g. propyl palmitate, methyl stearate or methyl palmitate, and preferably their eutectic mixtures, or methyl cinnamate;
  natural and synthetic waxes such as montan waxes, montan ester waxes, carnauba wax, polyethylene wax, oxidized waxes, polyvinyl ether wax, ethylene-vinyl acetate wax or hard waxes obtained from the Fischer-Tropsch process;
  halogenated hydrocarbons such as chloroparaffins, bromooctadecane, bromopentadecane, bromononadecane, bromoeicosane, bromodocosane.

Mixtures of these substances are also suitable as long as the melting point is not reduced below the desired region or the heat of fusion of the mixture becomes too low for practical use.

For applications-related reasons, it may be advantageous to add soluble compounds to the lipophilic substance so as to avoid depression of the freezing point. Such compounds have a melting point which is from 20 to 120° higher than that of the lipophilic substance, as described in U.S. Pat. No. 4,797, 160. Examples which may be mentioned are fatty acids, fatty alcohols, fatty amides and aliphatic hydrocarbon compounds.

The same applies to flame retardants such as the above-mentioned halogenated hydrocarbons, decabromo(diphenyl oxide), octabromo(diphenyl oxide), antimony oxide or the flame retardant additives described in U.S. Pat. No. 4,797, 160, which can likewise be added for applications-related reasons.

The lipophilic substances are chosen as a function of the temperature range in which the heat storage materials are to be used. For example, in the case of heat storage materials in building materials in Europe, preference is given to using lipophilic substances whose solid/liquid phase transition is in the temperature range from 0 to 60° C. Thus, single substances or mixtures having transformation temperatures of from 0 to 25° C. are generally employed for exterior applications and ones having transformation temperatures of from 15 to 30° C. are generally used for interior applications. In the case of solar applications in combination with building materials as storage medium or for superheating avoidance in transparent thermal insulation, as described in EP-A 333 145, transformation temperatures of from 30 to 60° C. are especially suitable. It is advantageous to use, for example, alkane mixtures as are obtained as industrial distillate and are commercially available as such.

The weight ratio of monomers/lipophilic substance is $\leq 1$, preferably $\leq 0.5$, in particular $\leq 0.35$.

A stable oil-in-water emulsion can be prepared either by emulsification of the lipophilic substance in water and subsequent addition of the monomers or by emulsification of the solution of the monomers in the lipophilic substance in water. If appropriate, the lipophilic substance is, depending on its phase transition temperature, introduced in molten form. General conditions and apparatuses for producing an emulsion are known to those skilled in the art.

For the industrial-scale production of oil-in-water emulsions, in particular those of latent heat storage materials, it is advisable, as described in the earlier German patent application 101 560 17.6, to pass the mixture of oil and water phases a number of times through a shear field located outside the reservoir/polymerization vessel until the desired droplet size has been reached. The shear energy introduced into the oil-in-water emulsion is from 250 to 25 000 watt×h/m$^3$ of the batch minus the pump energy required.

Suitable apparatuses for generating a shear field are comminution machines which operate according to the rotor-stator principle, e.g. toothed ring dispersion machines, colloid mills and corundum disk mills and also high-pressure and ultrasound homogenizers. To regulate the droplet size, it can be advantageous to additionally install pumps and/or flow restrictors in the circuit around which the emulsion circulates.

After production of the stable oil-in-water emulsion of the desired mean droplet size of from 0.5 to 100 μm, preferably from 1 to 80 μm, in particular from 1 to 50 μm, very particularly preferably from 1 to 30 μm, the polymerization is triggered by heating. If it has not already been done during the emulsification procedure, the free-radical initiator is added prior to the polymerization.

As free-radical initiators for the polymerization reaction proceeding by a free-radical mechanism, it is possible to use the customary peroxo and azo compounds, advantageously in amounts of from 0.2 to 5% by weight, based on the weight of the monomers.

Depending on the state of matter of the free-radical initiator and its solubility behavior, it can be added as such, but preferably as a solution, emulsion (liquid in liquid) or suspension (solid in liquid), which makes it possible to meter, in particular, small amounts of free-radical initiator more precisely.

Preferred free-radical initiators are tert-butyl peroxyneodecanoate, tert-amyl peroxypivalate, dilauroyl peroxide, tert-amyl peroxy-2-ethylhexanoate, 2,2'-azobis(2,4-dimethylvaleronitrile), 2,2'-azobis(2-methylbutyronitrile), dibenzoyl peroxide, tert-butyl per-2-ethylhexanoate, di-tert-butyl peroxide, tert-butyl hydroperoxide, 2,5-dimethyl-2,5-di(tert-butylperoxy)hexane and cumene hydroperoxide.

Particularly preferred free-radical initiators are di(3,5,5-trimethylhexanoyl) peroxide, 4,4'-azobisisobutyronitrile, tert-butyl perpivalate and dimethyl 2,2-azobisisobutyrate. These have a half-life of 10 hours in a temperature range from 30 to 100° C.

In general, the polymerization is carried out at from 20 to 100° C., preferably from 40 to 80° C. Depending on the desired lipophilic substance, the oil-in-water emulsion should be formed at a temperature at which the core material is liquid/oily. It is therefore necessary to choose a free-radical initiator whose decomposition temperature is above this temperature and likewise to carry out the polymerization at from 2 to 50° C. above this temperature, so that it may be necessary to choose free-radical initiators whose decomposition temperature is above the melting point of the lipophilic substance.

A useful process variant for lipophilic substances having a melting point up to about 60° C. is a reaction temperature which commences at 60° C. and is increased to 85° C. during the course of the reaction. Advantageous free-radical initiators have a half-life of 10 hours in the range from 45 to 65° C., e.g. t-butyl perpivalate.

According to a further process variant for lipophilic substances having a melting point above 60° C., a temperature program which commences at higher reaction temperatures is chosen. For initial temperatures of about 85° C., preference is given to free-radical initiators having a half-life of 10 hours in the range from 70 to 90° C., e.g. t-butyl per-2-ethylhexanoate.

The polymerization is advantageously carried out at atmospheric pressure, but it can also be carried out at reduced or slightly elevated pressure, e.g. at a polymerization temperature above 100° C., i.e. in the range from about 0.5 to 5 bar.

The reaction times in the polymerization are normally from 1 to 10 hours, usually from 2 to 5 hours.

Microcapsules are preferably formed by stepwise heating of the oil-in-water emulsion. Here, stepwise means that the reaction is treated by decomposition of the free-radical initiator induced by an increase in the temperature and the polymerization is controlled by further heating which can be carried out continuously or periodically. The rate at which the polymerization occurs can be controlled by selection of the temperature and the amount of free-radical initiator. This is preferably achieved by means of a program with increasing temperature. The total polymerization time can, for this purpose, be divided into two or more periods. The first polymerization period is characterized by a slow decomposition of the polymerization initiator. In the second polymerization period and any further polymerization periods, the temperature of the reaction mixture is increased to accelerate the decomposition of the polymerization initiators. The temperature can be increased in one step or in a plurality of steps or continuously in a linear or nonlinear fashion. The temperature difference between the commencement and the end of the polymerization can be up to 50° C., In general, this difference is from 3 to 40° C., preferably from 3 to 30° C.

After the final temperature has been reached, the polymerization is advantageously continued for a period of up to about 2 hours to reduce residual monomer contents.

After the end of the actual polymerization reaction at a conversion of from 90 to 99% by weight, it is generally advantageous for the aqueous microcapsulte dispersions to be substantially free of substances which give an odor, e.g. residual monomers and other volatile organic substituents. This can be achieved in a manner known per se using physical means, either by distillation (in particular steam distillation) or by stripping with an inert gas.

The residual monomer content can also be reduced chemically by free-radical after-polymerization, in particular in the presence of redox initiator systems as are described, for example, in DE-A 44 35 423, DE-A 44 19 518 and DE-A 44 35 422. Suitable oxidants for redox-initiated after-polymerization are, in particular, hydrogen peroxide, tert-butyl hydroperoxide, cumene hydroperoxide or alkali metal peroxosulfates. Suitable reducing agents are sodium disulfite, sodium hydrogen sulfite, sodium dithionite, sodium hydroxyethanesulfinate, formamidinesulfinic acid, acetone bisulfite (=sodium hydrogensulfite addition product with acetone), ascorbic acid or sugar compounds having a reducing action, or water-soluble mercaptans such as mercaptoethanol. The after-polymerization using the redox initiator system is carried out at from 10 to 100° C., preferably from 20 to 90° C. The redox partners can, independently of one another, be added to the microcapsule dispersion either all at once, a little at a time or continuously, over a period of from 10 minutes to 4 hours. To improve the after-polymerization action of the redox initiator system, soluble salts of metals having a number of oxidation states, e.g. iron, copper or vanadium salts, can also be added to the microcapsule dispersion. Complexing agents which keep the metal salts in solution under the reaction conditions are frequently also added.

After the polymerization is complete, the microcapsules are present as a dispersion in water. This dispersion can either be processed further as such or the microcapsules can be separated off from the aqueous phase and spray dried, as descrcibed in WO-A-9 924 525.

The spray drying of the microcapsule dispersion can be carried out in a customary manner. In general, the inlet temperature of the hot air stream is in the range from 100 to 200° C., preferably from 120 to 160° C., and the outlet temperature of the air stream is in the range from 30 to 90° C., preferably from 60 to 80° C. The spraying of the aqueous polymer dispersion in the hot air stream can be carried out, for example, by means of single-fluid or multifluid nozzles or by means of a rotating disk. The polymer powder is normally separated off using cyclones or filters. The sprayed aqueous polymer dispersion and the hot air stream are preferably conveyed in cocurrent.

The microcapsules of the present invention have the mean particle sizes set in the emulsification step. They have a narrow particle size distribution. The microcapsules of the present invention have a low proportion of capsules having a diameter of $\leq 4$ μm compared to the overall distribution of microcapsules of the prior art having the same mean diameter. It has also been found that the microcapsules of the present invention display good heats of fusion.

Depending on the lipophilic substance, the microcapsules of the present invention are suitable for carbonless copying papers, in cosmetics, for the encapsulation of perfumes, flavors or adhesives or in crop protection. The microcapsules of the present invention are particularly useful as latent heat storage materials. Such latent heat storage materials have a wide range of applications. They can thus be advantageously incorporated into textiles such as woven fabrics, textile coatings, nonwovens (e.g. felts), etc. A further field of application is binding building materials containing mineral, siliceous or polymeric binders. Here, a distinction is made between moldings and coating compositions. They are stable to hydrolysis in the presence of the aqueous and often alkaline aqueous materials.

For the purposes of the present invention, a mineral-based molding is a molding which is produced from a mixture of a mineral binder, water, aggregates and, if appropriate, auxiliaries after shaping by the mineral binder/water mixture curing as a function of time, if appropriate at elevated temperature. Mineral binders are generally known. They are finely divided inorganic materials such as lime, plaster of Paris, clay and/or cement which are converted into their ready-to-use form by mixing with water. These mixtures harden to a rock-like mass when left to stand, in air or even under water, if appropriate at elevated temperature.

The aggregates are generally particulate or fibrous, natural or synthetic rock/mineral (pebbles, sand, glass fibers or mineral fibers), in special cases also metals or organic aggregates or mixtures of the aggregates mentioned, having particle sizes or fiber lengths which are matched in a manner known per se to the respective applications. Pigments are frequently also used among the aggregates to impart a color.

Possible auxiliaries are, in particular, substances which accelerate or retard curing or influence the elasticity or porosity of the cured mineral-based molding. They are, in particular, polymers as are known, for example, from U.S. Pat. No. 4,340,510, GB-B 15 05 558, U.S. Pat. Nos. 3,196,122, 3,043,790, 3,239,479, DE-A 43 17 035, DE-A 43 17 036, JP-A 91/131 533 and other documents.

The microcapsules are particularly useful for modifying mineral-based binding building materials (mortar-like preparations) which contain a mineral binder comprising from 70 to 100% by weight of cement and from 0 to 30% by weight of plaster of Paris. This is particularly the case when cement is the sole mineral binder. The effect according to the present invention is essentially independent of the type of cement. Depending on the particular circumstances, it is thus possible to use blast furnace slag cement, oil shale cement, Portland cement, hydrophobicized Portland cement, quick-setting cement, expanding cement or alumina cement, with the use of Portland cement having been found to be particularly useful. Further details may be found in DE-A 19 623 413.

The dry compositions of mineral-based binding building materials typically contain, based on the amount of mineral binder, from 0.1 to 20% by weight of microcapsules. The mineral-based binding building materials according to the present invention have a very good heat storage capacity compared to conventional building materials.

The microcapsules are particularly preferably used in mineral-based coating compositions such as plaster or render. Such a plaster for interior use usually comprises plaster of Paris as binder. The greater the proportion of microcapsules in the coating composition, the greater the heat-storage effect. In general, the weight ratio of plaster of Paris/microcapsules is from 95:5 to 70:30. Higher proportions of microcapsules are naturally possible.

Coatings for exterior applications, e.g. exterior walls of buildings or humid/damp rooms, can comprise cement (cement-containing renders), lime or water glass (mineral or silicate renders) or polymer dispersions (polymer-based renders) as binders together with fillers and, if appropriate, pigments for imparting a color. The proportion of microcapsules in the total solid corresponds to the weight ratios for gypsum plasters.

The cured gypsum plaster has not only an improved heat storage capacity but also a reduced tendency to absorb water and a higher elasticity.

The microcapsules are also suitable as additive in polymeric moldings or polymeric coating compositions. For the purposes of the present invention, these are thermoplastic and thermoset polymers in whose processing the microcapsules are not destroyed. Examples are epoxy, urea, melamine, polyurethane and silicone resins and also surface coating compositions which may be either solvent-based surface coatings, high solid coatings, powder coatings or water-based coatings, and dispersion films. The microcapsules are also suitable for incorporation into polymer foams and fibers. Examples of foams are polyurethane foam, polystyrene foam, latex foam and melamine resin foam.

Advantageous effects can also be achieved when the microcapsules are incorporated into mineral-based moldings which are foamed.

The microcapsules of the present invention are preferably used in mineral-based moldings, mineral-based coating compositions and gypsum plasterboard.

The microcapsules can be incorporated as powder or as dispersion into the gypsum plasterboard. Preference is given to using from 5 to 40% by weight, in particular from 20 to 35% by weight, of microcapsules, based on the total weight of the gypsum plasterboard (dry matter). The production of gypsum plasterboard is generally known.

Gypsum plasterboard generally comprises a gypsum core with paperboard sheets on each side. They are usually produced by introducing an aqueous plaster of Paris slurry either batchwise or continuously between two cellulose-based sheets of paperboard to form the plasterboard. The plaster of Paris slurry is, as is generally known, produced by continuous addition and continual mixing of calcium sulfate β-hemihydrate in water with additives. The microcapsules can either be introduced together with the calcium sulfate or they can already be present as an aqueous dispersion. The plaster of Paris slurry obtained in this way is applied to the paperboard sheets, for example sprayed on, and covered with paperboard.

During incipient curing, the plasterboard sheets are shaped in a press to form strips having, for example, a width of 1.2-1.25 m and a thickness of 9.25, 12.5, 15.0, 18.0 or 25 mm. These strips cure within a few minutes and are cut into boards. In this state, one third of the weight of the boards is generally still free water. To remove the residual water, the boards are subjected to heat treatment at about 250° C., The gypsum plasterboard obtained in this way has a density of 750-950 kg/m$^3$.

Paperboard having a weight of about 300 g/m$^2$ is usually used for gypsum plasterboard. Paperboard of this type is usually produced in a plurality of layers, with the last layer representing the covering layer of the paperboard and having a weight of from 10 to 100 g/m$^2$, preferably from 30 to 70 g/m$^2$.

In place of cellulose-based paperboard, it is also possible to use alternative, fibrous sheets as covering layers on each side of the gypsum plasterboard of the present invention. Alternative materials are polymer fibers comprising, for example, polypropylene, polyester, polyamide, polyacrylates, polyacrylonitrile and the like. Glass fibers are also suitable. The alternative materials can be used as woven fabrics and as nonwovens, i.e. as felt-like sheets.

Such gypsum plasterboard is known, for example, from U.S. Pat. Nos. 4,810,569, 4,195,110 and 4,394,411.

Improved adhesion to substrates such as paperboard can be achieved by addition of natural and/or synthetic polymers. Suitable water-soluble polymers are: starch and starch ethers, relatively high molecular weight methylcellulose and other cellulose derivatives, guar gum derivatives, thermoplastic dispersion powders and liquid dispersions based on vinyl acetate, ethylene-vinyl acetate, vinyl propionate, styrene-butadiene, styrene acrylate and pure acrylate. The amount of polymer added is 0.1 to 5% by weight, based on the dry weight of gypsum plaster and latent heat storage material.

It is also advantageous to add water retention agents and/or thickeners as further additives to gypsum plaster compositions. Examples are polyvinyl alcohol, cellulose derivatives such as hydroxyethylcellulose, hydroxypropylcellulose, carboxymethylcellulose, polyacrylic acid and copolymers of acrylic acid, e.g. polyethylene-co-acrylic acid, polymaleic acid-co-acrylic acid, polyisobutylene-co-acrylic acid and acrylic acid-rich polymer dispersions with styrene or acrylic esters or vinyl acetate, as are used as thickeners for, for example, paper finishing. The water retention agents and/or thickeners are usually used in amounts of from 0.05 to 2% by weight, based on the total dry weight of plaster of Paris and latent heat storage material.

The percentages quoted in the examples are by weight.

EXAMPLE 1

Water phase:

| | |
|---|---|
| 572 g | of water |
| 80 g | of a 50% strength colloidal dispersion of $SiO_2$ in water at pH 9.3 (mean particle size: 108.6 nm, number average by light scattering) |
| 2.1 g | of a 2.5% strength aqueous sodium nitrite solution |
| 20 g | of methylcellulose, 1% strength aqueous solution (viscosity = 15 000 mPas at 2% in water) |

Oil phase:

| | |
|---|---|
| 440 g | of $C_{18}$–$C_2$-alkane (industrial distillate) |
| 77 g | of methyl methacrylate |
| 33 g | of butanediol diacrylate |
| 0.76 g | of ethylhexyl thioglycolate |
| 1.35 g | of t-butyl perpivalate |

Feed stream 1: 1.09 g of t-butyl hydroperoxide, 70% strength in water

Feed stream 2: 0.34 g of ascorbic acid, 0.024 g of NaOH, 56 g of $H_2O$

The above water phase was placed in a vessel at room temperature and the pH was adjusted to 4 by means of 3 g of 10% strength nitric acid. After addition of the oil phase, the latter was dispersed by means of a high-speed stirrer at 4200 rpm. After dispersion for 40 minutes, a stable emulsion having a droplet diameter of from 2 to 12 µm was obtained. While stirring with an anchor stirrer, the emulsion was heated to 56° C. over a period of 4 minutes, to 58° C. over a further period of 20 minutes, to 71° C. over a further period of 60 minutes and to 85° C. over a further period of 60 minutes. The microcapsule dispersion formed was cooled to 70° C. while stirring and feed stream 1 was introduced. Feed stream 2 was metered in over a period of 80 minutes while stirring at 70° C. The mixture was subsequently cooled. The resulting microcapsule dispersion had a solids content of 46.8% and a mean particle size D(4.3)=9.5 µm (measured by Fraunhofer diffraction, volume mean).

The dispersion could be dried without problems in a laboratory spray dryer using a two-fluid nozzle and a cyclone separator at an inlet temperature of the hot gas of 130° C. and an outlet temperature of the powder from the spray dryer of 70° C. Microcapsule dispersion and powder displayed a melting point in the range from 26.5 to 29.5° C. and a transformation enthalpy of 120 J/g of alkane mixture in differential scanning calorimetry at a heating rate of 1 K/minute. The proportion of capsules having a size of ≦4 µm was 3%.

EXAMPLE 2

Not According to the Present Invention

Microcapsules were produced using a method similar to Example 1, with the difference that 263 g of a 30% strength colloidal dispersion of $SiO_2$ in water (pH 9.8, mean particle size: 19 nm, number average by light scattering; Ludox® HS, DuPont) and 10.1 g of a 20% strength aqueous solution of a polymer of 59% of 2-acrylamido-2-methylpropanesulfonic acid sodium salt, 20% of acrylic acid, 20% of methyl acrylate and 1% of styrene (K value=69) were used in place of methylcellulose. The resulting microcapsule dispersion had a solids content of 46.5% and a mean particle size D(4.3)=9.1 µm. The proportion of capsules having a size of ≦4 µm was 30%.

We claim:

1. A process for producing a microcapsule comprising one or more lipophilic substances as core material and a polymer as capsule shell, by polymerizing an oil-in-water emulsion comprising
   from 30 to 100% by weight, based on the total weight of the monomers, of one or more $C_1$-$C_{24}$-alkyl esters of acrylic and/or methacrylic acid (monomer I),
   from 0 to 80% by weight, based on the total weight of the monomers, of a bifunctional or polyfunctional monomer (monomer II) which is insoluble or sparingly soluble in water and
   from 0 to 40% by weight, based on the total weight of the monomers, of other monomers (monomers III),
   the lipophilic substance and
   solid inorganic particles having a mean particle size of from 45 to 1000 nm, wherein the weight ratio of monomers/lipophilic substance is ≦0.5, by a free-radical mechanism and, if desired, spray drying the polymerized emulsion.

2. A process as claimed in claim 1, wherein the oil-in-water emulsion is produced at a pH in the range from 2 to 6 which has been set by means of one or more acids selected from the group consisting of citric acid, formic acid, hydrochloric acid, nitric acid, phosphoric acid, sulfuric acid, and amidosulfonic acid.

3. The process as claimed in claim 1, wherein the solid inorganic particles are selected from the group consisting of finely divided silicas, magnesium pyrophosphate and tricalcium phosphate.

4. The process as claimed in claim 1, wherein the solid inorganic particles have a mean size of from 45 to 500 nm.

5. The process as claimed in claim 1, wherein the oil-in-water emulsion further comprises uncharged protective colloids.

6. The process as claimed in claim 1, wherein the monomer mixture consists of
   from 30 to 95% by weight, based on the total weight of the monomers, of one or more $C_1$-$C_{24}$-alkyl esters of acrylic and/or methacrylic acid (monomer I),
   from 5 to 60% by weight, based on the total weight of the monomers, of a bifunctional or polyfunctional monomer (monomers II) which is insoluble or sparingly soluble in water and
   from 0 to 40% by weight, based on the total weight of the monomers, of other monomers (monomers III).

7. The process as claimed in claim 1, wherein the lipophilic substance has its solid/liquid phase transition in the temperature range from −20 to 120° C.

* * * * *